UNITED STATES PATENT OFFICE.

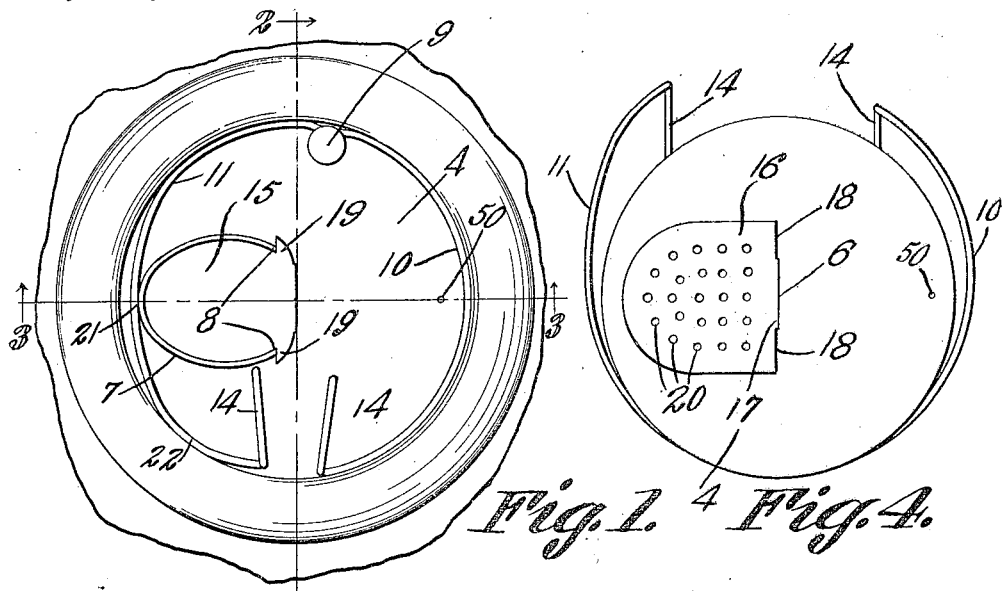
Fig. 1. Fig. 4.
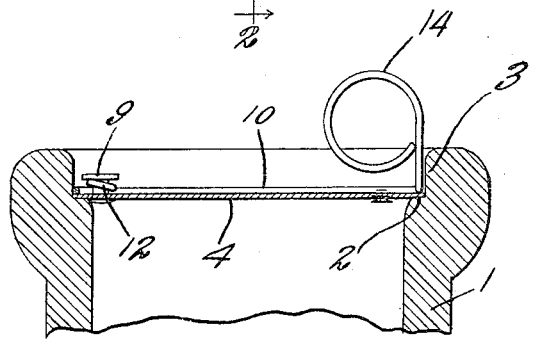
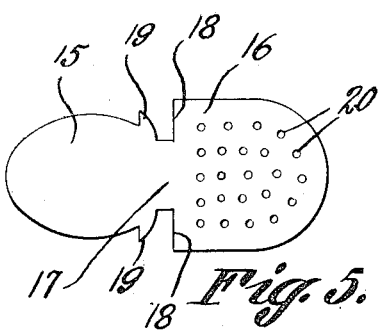
Fig. 2. Fig. 5.
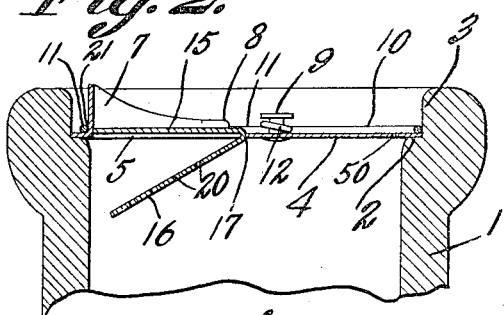
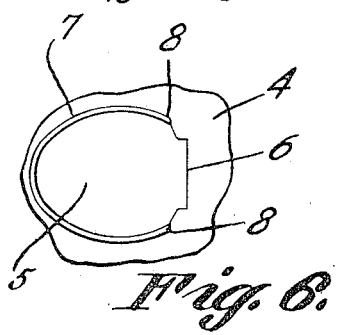
Fig. 3. Fig. 6.

GEORGE WIEBER, OF WASHINGTON, DISTRICT OF COLUMBIA.

MILK-BOTTLE TOP.

1,224,251.     Specification of Letters Patent.     Patented May 1, 1917.

Application filed March 8, 1916. Serial No. 82,959.

*To all whom it may concern:*

Be it known that I, GEORGE WIEBER, a citizen of the United States, residing at Washington, in the District of Columbia, have invented a new and useful Milk-Bottle Top, of which the following is a specification.

The device forming the subject matter of this application is a cap for milk bottles and other receptacles. One object of the invention is to improve the spring whereby the cap is held in the receptacle.

Another object of the invention is to improve the closure which is carried by the lid.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in top plan, a receptacle whereunto the present device has been applied, the receptacle being broken away;

Fig. 2 is a section on the line 2—2 of Fig. 1;

Fig. 3 is a section on the line 3—3 of Fig. 1;

Fig. 4 is a bottom plan of the cap, removed from the bottle;

Fig. 5 is a plan of the blank out of which the closure is made;

Fig. 6 is a fragmental top plan of the lid, the pivoted closure being removed, in order that the outline of the opening in the lid may be clearly seen.

In the accompanying drawings, the numeral 1 indicates a receptacle of any desired sort, such as a milk bottle, the receptacle 1 being provided with an internal shoulder 2 and with an upstanding flange 3, as usual.

In carrying out the present invention there is provided a lid 4 preferably but not necessarily fashioned from metal, the lid 4 being adapted to rest on the shoulder 2 within the flange 3. In the lid 4 near to one edge thereof is formed an opening 5, the outline of which is clearly shown in Fig. 6. The opening 5 terminates in a reduced rear extension 6. Upstanding from the lid 4 about the opening 5, and secured to the lid, is a pouring spout 7, the rear ends of which are shown at 8, the spout being of U-shape in top plan. The lid 4 has a vent 50.

Fixed to and upstanding from the lid 4 is a headed stud 9. The invention comprises a spring whereby the lid 4 is held in the bottle 1, the spring including arms 10 and 11, the spring being of arched form. Intermediate its ends, the spring is twisted upon itself to form an eye 12 surrounding the headed stud 9. This eye 12 does not embrace the headed stud 9 closely, but is so mounted thereon that the spring may swing in a direction parallel to the lid 4 on the stud. This operation permits the arms 10 and 11 of the spring to be adjusted properly with respect to the flange 3 of the bottle 1, independently of the resiliency of the arms, and before the arms have been compressed, to lie within the flange 3 as shown in Fig. 1. The free ends of the arms 10 and 11 terminate in finger pieces 14 whereby the arms may be pressed together to lie within the flange 3 as shown in Fig. 1. The arms 10 and 11 of the spring are outwardly expansible, as Fig. 4 will make manifest. When the arms 10 and 11 of the spring lie within the flange 3, the arms expand outwardly against the flange and hold the lid 4 in place in the bottle 1. In this connection it is to be observed that the arm 11, as shown at 21 in Fig. 1 bears against the spout 7. Consequently, there is formed in the arm 11, a relatively stiff end 22, which exerts a strong holding action on the flange 3, and aids in keeping the lid 4 in place.

A closure for the opening 5 in the lid 4 is provided, the closure being shown in the form of a blank in Fig. 5. The closure preferably is made of metal and embodies an outer leaf 15, and inner leaf 16 and a neck 17 connecting the leaves, there being shoulders 18 at the inner end of the leaf 16 and the leaf 15 being provided with outstanding fingers 19. The leaves 15 and 16 are disposed at an acute angle to each other as shown in Fig. 3 of the drawing. The inner leaf 16 preferably is slightly larger than the opening 5, the outer leaf 15 being of such a size that it will fit within the spout 7 without friction. The neck 17 lies in the rear extension 6 of the opening, the shoulders 18 on the leaf 16 coact with the lower surface of the lid 4 and the fingers 19 on the outer leaf 15 coact with the upper surface of the lid behind the ends 8 of the spout 7. From the foregoing it will be obvious that no pivot pin is required to hold the closure comprising the leaves 15 and 16 in place on the lid 4. The closure may swing freely but it cannot drop downwardly into the bottle or move outwardly. Neither can the closure move as an entity in a direction parallel to the section line 3—3 of Fig. 1.

When the bottle is upright, as shown in Fig. 3, the fingers 19 bear against the rear ends 8 of the spout 7, and the bent neck 17 is thrust backwardly against the rear edge of the part 6 of the opening 5 in the lid 4. Consequently, the upper or outer leaf 15 of the lid cannot drop downwardly below the position shown in Fig. 3. When the upper leaf 15 of the lid is thus arranged the spout 7 is closed and dirt cannot find its way into the bottle 1. When, however, the bottle is inclined, the outer leaf 15 swings to an open position and the inner leaf 16 swings to a closed position. The leaf 16 is provided with any desired number of perforations 20 through which the milk or other liquid may pass, the inner leaf acting as a strainer, and the vent 50 admitting air to the bottle to facilitate the pouring operation.

Having thus described the invention, what is claimed is:—

1. In a device of the class described, a lid having an opening; and a closure for the opening pivotally assembled with the lid, the closure comprising angularly disposed inner and outer leaves, the inner leaf being perforated to form a strainer.

2. In a device of the class described, a lid having an opening; a U-shaped spout upstanding from the lid about the opening; and a closure for the opening, the closure comprising angularly disposed inner and outer leaves and a neck connecting the leaves, the neck being located in the rear end of said opening, the inner leaf being larger than said opening, the outer leaf lying within the spout and embodying lateral fingers which, under the weight of the lower leaf, coact with the rear ends of the spout to press the neck against the lid at the rear end of said opening, thereby limiting the downward swinging movement of both of the leaves.

3. In a device of the class described, a lid; an arched spring comprising outwardly expansible arms; and means for pivotally connecting the spring with the lid intermediate the ends of the spring to permit a bodily swinging movement of the spring parallel to the lid, and to permit adjustment of the arms with respect to the periphery of the lid, independently of the resiliency of the arms.

4. In a device of the class described, a lid having an opening; a spout upstanding from the opening; and an arched spring secured to the lid, the arched spring being flexed inwardly across the spout, to define a relatively stiff holding end in the spring.

5. In a device of the class described, a lid having an opening; a spout upstanding from the opening; and an arched spring attached to the lid intermediate the ends of the spring, the spring comprising arms, one of which is flexed across the spout to form a relatively stiff holding end in the said arm.

In testimony that I claim the foregoing as my own, I have hereto affixed my signature in the presence of two witnesses.

GEORGE WIEBER.

Witnesses:
V. S. BLUNDON,
WM. H. SPIGNUL.

Copies of this patent may be obtained for five cents each, by addressing the "Commissioner of Patents, Washington, D. C."